(No Model.)
J. M. GOODMAN.
HOOF PROTECTOR.
No. 252,758.                                Patented Jan. 24, 1882.
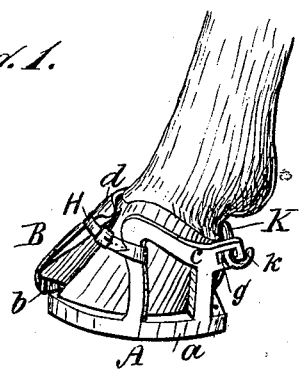
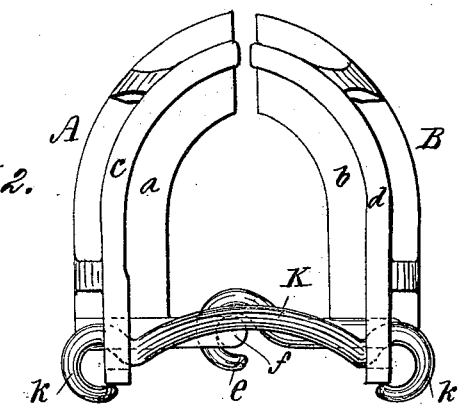
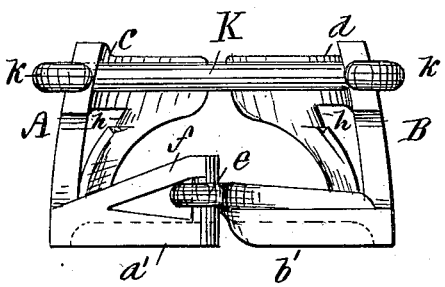
WITNESSES:
Theo. G. Hoster
C. Sedgwick
INVENTOR:
J. M. Goodman
BY Munn & Co.
ATTORNEYS.

UNITED STATES PATENT OFFICE.

JOHN M. GOODMAN, OF MILL CREEK, PENNSYLVANIA.

HOOF-PROTECTOR.

SPECIFICATION forming part of Letters Patent No. 252,758, dated January 24, 1882.

Application filed October 5, 1881. (No model.)

*To all whom it may concern:*

Be it known that I, JOHN M. GOODMAN, of Mill Creek, in the county of Huntingdon and State of Pennsylvania, have invented a new and Improved Hoof-Protector for Cattle, of which the following is a full, clear, and exact specification.

The object of my invention is to provide a cheap, efficient, and easily-removable shoe for protecting the feet of fat cattle and oxen while being worked or driven long distances upon the road, and one having such construction that the parts of the foot of the animal are left free to move naturally as the animal walks.

My invention consists principally of two right and left ground shoes or plates, upon which the foot of the animal rests, each plate being provided with upwardly-projecting side flanges or fenders, which are inwardly inclined and curved to fit the sides of the hoof, the two parts of the shoe being adapted to be secured upon the foot in any suitable manner.

The invention also consists in the special means for securing the shoe to the animal's foot, as hereinafter more fully described.

Reference is to be had to the accompanying drawings, forming part of this specification, in which similar letters of reference indicate corresponding parts in all the figures.

Figure 1 is a perspective view, showing my new and improved hoof-protector or shoe as it appears when placed upon the hoof of the animal. Fig. 2 is a plan view of the protector or shoe, and Fig. 3 is a rear elevation of the same.

The parts A and B of the shoe are oppositely curved, or made right and left, and are formed of the ground-plates $a$ and $b$ and of the side curved and inwardly-inclined flanges or fenders $c$ and $d$, which reach a suitable distance above the ground-plates to fit upon the sides of the foot of the animal, as shown in Fig. 1. The ground-plates meet at their forward ends immediately under where the hoof of the animal divides, so that when the shoe is secured to the foot one part of the hoof rests upon the part $a$ of the shoe and the other part of the foot upon the part $b$ of the shoe, and the rear ends of the plates are formed with the arms $a'$ and $b'$, which are adapted to be hooked together by means of the hook $e$ and eye $f$ in such manner as to form a sort of hinge, to permit the movement of the main parts of the shoe in accordance with the natural action of the foot. The rear ends of the side flanges or fenders, $c$ and $d$, are formed with the slots or openings $g\ g$, into which the hooks $k\ k$ of the curved connecting-rod K engage, which rod, when in place, passes over the heel of the foot of the animal, and thus holds the rear part of the shoe firmly to the animal's foot. The forward part of the shoe is secured by the strap H, which rests in the depressions $b\ b$ of the side flanges or fenders (shown in Fig. 3) and buckles across the front of the hoof, as shown in Fig. 1.

Thus constructed, the shoe may be easily placed upon the foot of the animal, and serves as a thorough protection, and may be removed at any time, or it may be left on permanently, as desired.

Having thus fully described my invention, I claim as new and desire to secure by Letters Patent—

1. The hoof-protector herein shown and described, formed of the oppositely-curved parts A and B, formed of the bottom plates, $a$ and $b$, and the side flanges, $c$ and $d$, the parts being adapted to be secured to the foot of the animal, substantially as and for the purposes set forth.

2. The parts A and B, formed of the bottom plates, $a$ and $b$, and the side flanges, $c$ and $d$, and provided with the hook $e$ and eye $f$, in combination with the hooked connecting-rod K and the strap H, substantially as and for the purposes set forth.

JOHN MILES GOODMAN.

Witnesses:
G. W. SIMPSON,
B. R. FOUST.